United States Patent [19]

Gyi

[11] Patent Number: 4,561,610
[45] Date of Patent: Dec. 31, 1985

[54] TAPE CARTRIDGE LOADING APPARATUS
[75] Inventor: Ko K. Gyi, Thousand Oaks, Calif.
[73] Assignee: MegaTape Corporation, Duarte, Calif.
[21] Appl. No.: 634,564
[22] Filed: Jul. 26, 1984
[51] Int. Cl.⁴ .......................... G03B 1/04; G11B 15/32
[52] U.S. Cl. ..................................... 242/198; 360/132
[58] Field of Search .............. 242/192, 197, 198, 199; 360/71, 73, 90, 93, 96.5

[56] References Cited

U.S. PATENT DOCUMENTS

| | | | |
|---|---|---|---|
| 4,199,795 | 4/1980 | Hunter | 360/93 |
| 4,257,075 | 3/1981 | Wysocki et al. | 360/96.5 |
| 4,259,701 | 3/1981 | Pera | 360/96.5 |
| 4,295,169 | 10/1981 | Iwata et al. | 360/71 |
| 4,303,955 | 12/1981 | Kramer et al. | 360/93 |
| 4,369,474 | 1/1983 | Kamimura et al. | 360/96.1 |
| 4,445,650 | 5/1984 | Aura et al. | 242/192 |

Primary Examiner—Leonard D. Christian
Attorney, Agent, or Firm—Fraser and Bogucki

[57] ABSTRACT

An arrangement for loading a tape cartridge in a deck of a magnetic tape transport has a motor-driven pair of cams engaging different ones of a pair of pivotally mounted elongated arms disposed beneath the deck with one of the arms mounting a pawl extending through an aperture in the deck. Rotation of the cams causes movement of the pawl-mounting arm enabling the pawl to engage a ridge at the underside of a tape cartridge being loaded in the deck and push the cartridge into the region of an operative position adjacent a magnetic transducer assembly. Movement of the other elongated arm in conjunction with the pawl-mounting arm slides a fork assembly beneath the deck so as to raise three different pins coupled thereto and mounted within the deck. A partially conical pin and a rectangular pin adjacent the transducer assembly engage recesses of similar configuration at the underside of the tape cartridge to precisely position the cartridge relative to mutually perpendicular X and Y axes while at the same time urging the top of the cartridge base against a pair of height referencing rods so as to precisely position the forward portion of the cartridge relative to a vertical Z axis. The third pin engages the underside of the cartridge adjacent the rear portion thereof so as to position the rear portion of the cartridge relative to the Z axis against a further reference surface. Further rotation of the pair of cams and the resulting rotation of the pair of elongated arms pulls the pawl away from the cartridge and lowers the pins to permit removal of the cartridge from the deck.

22 Claims, 15 Drawing Figures

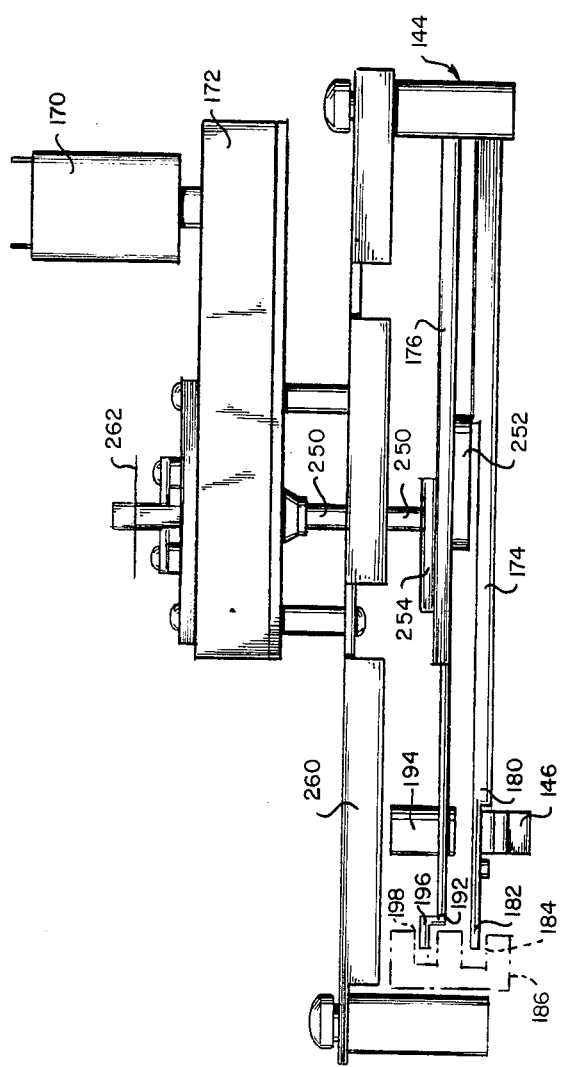

TAPE CARTRIDGE LOADING APPARATUS

BACKGROUND OF THE INVENTION

1. Field of the Invention

The present invention relates to magnetic tape transports utilizing a removable tape cartridge, and more particularly to an arrangement within a cartridge tape transport for loading and positioning a tape cartridge relative to a magnetic transducer assembly.

2. History of the Prior Art

It is known to provide a magnetic tape transport in which a length of tape is driven between opposite reels within a removable tape cartridge in rapid, bidirectional fashion. An example of such a magnetic tape transport is provided by U.S. Pat. No. 4,445,650 of Avra et al, issued May 1, 1984 and commonly assigned with the present application. The Avra et al patent describes a magnetic tape transport of the type ideally suited for data recording backup or "steaming" applications in data processing systems. Constant tape tension is achieved in the face of high speed bidirectional operation by an arrangement utilizing pairs of pulleys of slightly different diameter in conjunction with unidirectional clutches.

The magnetic tape transport described in the Avra et al patent utilizes a tape cartridge containing a length of magnetic tape which extends between and is wound around an opposite pair of reels. Loading of the tape cartridge into the transport is accomplished by inserting the cartridge through a slot in the front of the transport and pushing the cartridge into a desired operative position adjacent a magnetic transducer assembly. A door at the front of the cartridge is cammed into an open position during loading of the cartridge so as to expose the tape packs on the opposite reels for engagement by an opposite pair of capstans which are laterally movable within the deck of the tape transport. Thereafter, driving of the capstans results in driving of the tape packs on the opposite reels within the cartridge so as to advance the length of magnetic tape in a desired direction and at a desired speed relative to the magnetic transducer assembly. The magnetic transducer assembly is mounted so as to be vertically movable into one of a plurality of different possible positions so that the magnetic heads contained therein may address different ones of a plurality of tracks on the length of magnetic tape.

Magnetic tape transports of the type described in the Avra et al patent require relatively precise positioning of the tape cartridge on the deck of the transport so that the heads of the magnetic transducer assembly align with the proper tracks on the tape. The tape which is typically one-half inch in width may have as many as twenty-four different tracks disposed across the width thereof, requiring rather precise positioning of the tape relative to the magnetic transducer assembly in order to align the magnetic heads thereof with one or more of such tracks. Driving of the magnetic tape at nominal speeds on the order of 200 inches per second also requires rather precise positioning of the tape cartridge, as does the need to repeatedly achieve a particular tape wrap angle.

The tape transport described in the Avra et al patent positions the tape cartridge in a desired location within the deck using separate camming and locking arrangements. Following insertion of the tape cartridge through a slot in the front of the transport and into the region of an operative position, a camming arrangement is employed to force the cartridge into the operative position. Lateral movement of the cartridge is restrained by opposite bosses which serve to guide the cartridge into place as it is inserted into the transport. The camming arrangement achieves a desired height or Z axis positioning of the cartridge by pushing upwardly on the base of the cartridge so as to hold the upper surface of the cartridge base against a pair of generally horizontally disposed rods at the front end of the cartridge and against a reference point or surface on the transport housing which receives the top of the cartridge at a rear portion of the cartridge. The cartridge is prevented from sliding out of the operative position by a locking arrangement which includes a spring loaded shaft for engagement within a recess in the base of the cartridge.

While the camming and locking arrangements described in the Avra et al patent serve to position and lock the cartridge in place within the transport in reasonably accurate fashion, they have certain shortcomings, particularly with respect to the ease of loading and unloading of the cartridge. For one thing it is different to achieve the same tape wrap angle with repeated cartridge loadings. Also, tape reel misalignment may occur due to bending of the cartridge base as a result of the nature of the camming and locking arrangements. The camming and locking arrangements require manual actuation thereof.

A more desirable arrangement would be an automatic one which takes over and completes the loading of the cartridge in automatic fashion following partial insertion of the cartridge into the slot in the front of the transport housing and which is capable of releasing the cartridge electronically as well as in response to manually initiated command. Also, the positioning of the cartridge on the deck within the tape transport and relative to the magnetic transducer assembly could be improved by an arrangement which does not rely on opposite bosses or other guide members for correct lateral cartridge positioning but which instead positions the cartridge relative to X and Y axes by different and independent means.

Accordingly, it is an object of the invention to provide improved tape cartridge loading apparatus.

It is a further object of the invention to provide tape cartridge loading apparatus capable of completing the insertion of the tape cartridge into the transport and properly positioning the cartridge therein in automatic fashion and without the need for manual assistance.

It is a still further object of the invention to provide tape cartridge loading apparatus which positions a tape cartridge in a desired location relative to mutually perpendicular X, Y and Z axes automatically and in relatively precise fashion.

It is a still further object of the invention to provide tape cartridge loading apparatus which provides for release of a tape cartridge from a loaded position in automatic fashion and which can be electronically initiated.

BRIEF DESCRIPTION OF THE INVENTION

The foregoing and other objects and features in accordance with the invention are accomplished by tape cartridge loading apparatus the operation of which is initiated by partial insertion of the tape cartridge into the transport. Upon initiation of operation of the apparatus, a pawl in the region of the deck of the transport engages the cartridge and pulls it forward into the region of the desired position of the cartridge. Upon completion of the forward movement of the cartridge under the control of the pawl, a plurality of locking pins mounted within the deck are moved outwardly from a surface of the deck so as to engage the cartridge and move the cartridge into and lock the cartridge within a desired operative position. The pins which force the cartridge against a pair of deck mounted height referencing rods at the front end of the cartridge and a height referencing surface at the rear of the cartridge to achieve desired Z axis positioning at the same time engage recesses in the base of the cartridge in a manner which provides desired X and Y axes positioning of the cartridge. This insures engagement of the tape against a magnetic transducer assembly and at the same time acts to provide a constant wrap angle across the entire width of the tape. As the cartridge is moved into and locked within the desired location by the moving pins, the pawl is moved away from the cartridge in preparation for ultimate release of the cartridge after the desired data transfers are made on the tape. Release of the cartridge occurs when the pins are thereafter moved away from the locking position within or against the cartridge and back into the deck.

In a preferred arrangement of tape cartridge loading apparatus in accordance with the present invention a single drive motor and associated transmission are used to rotate two different cams of non-circular shape engaging a pair of elongated arms mounted for rotation about a common pivot axis at one end of each of the arms. The cams are shaped to achieve a certain motion profile of a cartridge. Insertion of a tape cartridge partly into a slot in the tape transport closes a switch to begin driving the motor and the associated transmission.

As the cams begin to rotate, a first one of the elongated arms which has a pawl mounted on an outer end thereof opposite the pivot axis begins to rotate about the pivot axis. The outer end of the first elongated arm which is contained within a cammed slot in a guide block rises as it rotates so as to raise the pawl upwardly through an aperture in the surface of a deck of the transport and engage the pawl against a ridge at the underside of the cartridge. Thereafter, as the first elongated arm continues to rotate about the pivot axis in response to rotation of the associated cam, the pawl moves along the aperture so as to push the cartridge into the region of a desired operative position thereafter adjacent a magnetic transducer assembly.

Following initial rotation of the first elongated arm, the second elongated arm is rotated about the pivot axis in response to rotation of the second cam which engages it. As the second elongated arm rotates, a pin at the outer end thereof which engages a fork assembly at the underside of the deck causes sliding movement of the fork assembly. The fork assembly has three different ramp portions thereof which are coupled to different ones of three pins slideably mounted in the deck. As the fork assembly undergoes sliding movement in response to rotation of the second elongated arm, the ramp portions of the fork assembly causes the three pins to raise within the deck and contact the underside of the cartridge. Two of the three pins which are located under a front portion of the cartridge adjacent the magnetic transducer assembly provide proper X and Y axis positioning of the cartridge. A first one of the two pins which is of partially conical shape at the outer tip thereof enters a circular recess in the base of the cartridge so as to define a pivot axis for potential rotation of the cartridge about such axis within a plane defined by the X and Y axes. Shortly after engagement of the circular recess by the first pin, the second of the two pins adjacent the forward portion of the cartridge which is of generally rectangular cross-sectional shape engages a recess of similar shape in the base of the cartridge, causing the cartridge to assume the proper angular position relative to the pivot axis defined by the first pin and thereby assume a rather precise position relative to the X and Y axes.

The upward movement of the first and second pins into the mating recesses in the base of the cartridge eventually results in the top of the cartridge base being forced into contact with a pair of generally horizontally disposed height referencing rods which are mounted on the deck and which define the desired height or Z axis positioning of the forward portion of the cartridge. A third one of the three pins which is spaced-apart from the first and second pin and is disposed adjacent of the rear portion of the cartridge engages the base of the cartridge as it rises just after the raising of the first two pins. Eventually, the third pin pushes the cartridge into contact with a height referencing surface defined by a portion of the transport housing above and inside of the cartridge loading slot to determine the desired height or Z axis positioning of the rear portion of the cartridge. The first and second pins are disposed directly beneath the pair of generally horizontally disposed height referencing rods and the third pin is disposed directly beneath the height referencing surface provided by the transport housing. This minimizes any tendency to bend the cartridge when it is locked in the operative position.

As the three pins rise and engage the base of the cartridge so as to force the cartridge into the desired operative position within the deck and relative to the magnetic transducer assembly, the continued rotation of the cam in contact with the first elongated arm allows such arm to reverse its direction of rotation and begin rotating in the opposite direction. This causes the pawl which has pushed the cartridge into the operative position to move away from the ridge at the bottom of the cartridge. With the pawl moved away from the cartridge and the three pins raised into position so as to locate and lock the cartridge within the desired operative position, driving of the motor is terminated so as to maintain the cartridge in the operative position.

When it is desired to unload the cartridge, driving of the motor is once again commenced. The pawl has previously been disengaged from and moved out of the way of the ridge at the bottom of the cartridge. Commencement of rotation of the cam contacting the second elongated arm causes the second elongated arm to reverse and being rotating in the opposite direction. This slides the fork assembly at the bottom of the deck in a direction opposite that previously described so that the ramp portions thereof cause the three pins to begin lowering back into the deck. When the three pins are eventually removed from contact with the base of the cartridge, the cartridge is partially ejected from the transport by the resilient force exerted to the tape packs of the opposite cartridge reels by the driving capstans. At this point a simple pulling motion removes the cartridge from the slot in the transport. The motor is eventually stopped at a point where the two elongated arms are located in positions in preparation for the next loading of a cartridge into the transport. Upon commencement of the next loading, the first elongated arm is again rotated so that the pawl at the end thereof engages and pushes the cartridge forward and the second elongated arm again rotates in a direction which slides the fork assembly in a manner which raises the three pins into contact with the base of the cartridge.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 15 is a side view of the loader mechanism of FIG. 13.

DETAILED DESCRIPTION

Figure 1:
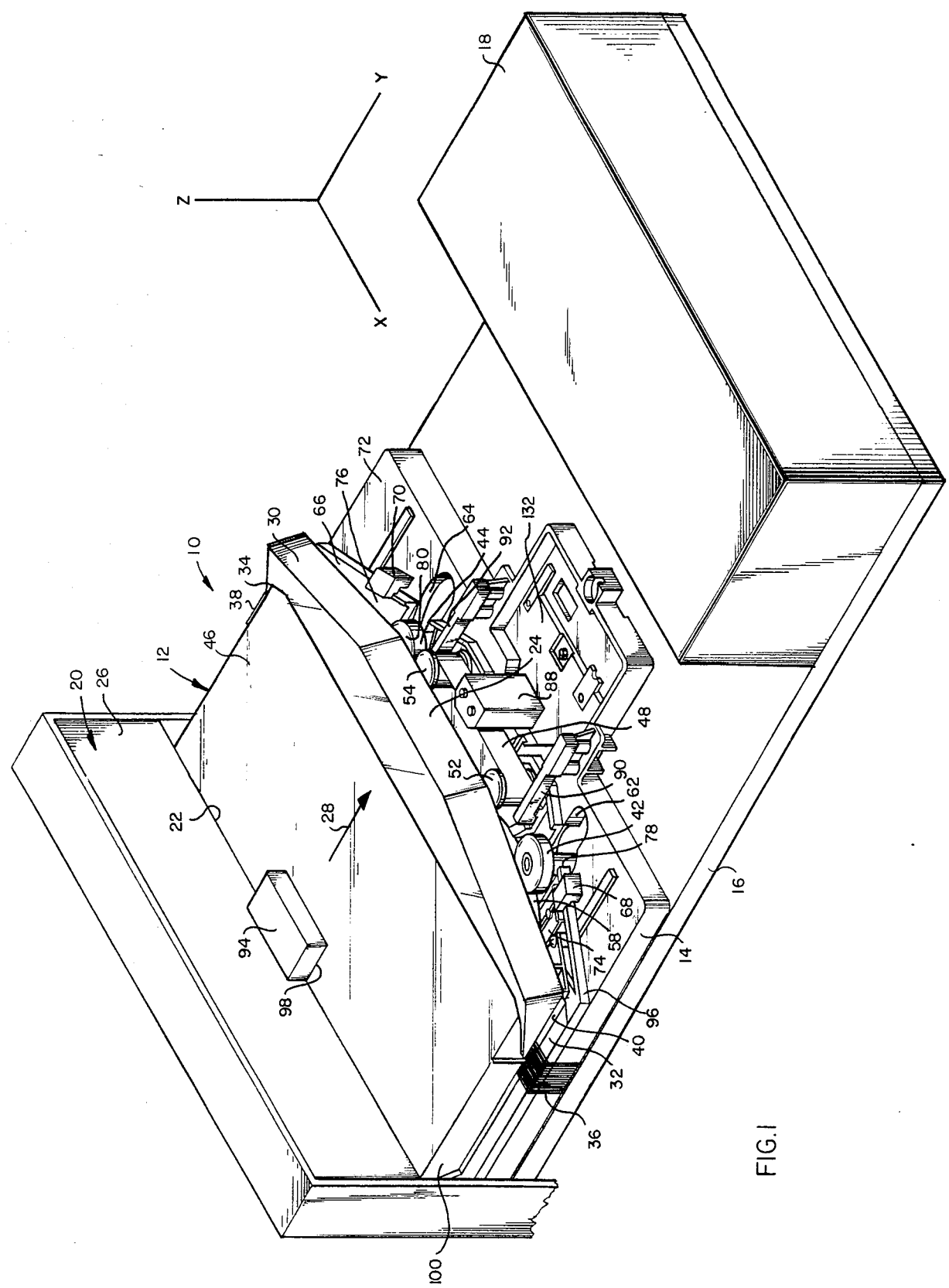
FIG. 1 is a perspective view of a tape transport havng tape cartridge loading apparatus in accordance with the invention, the tape transport being shown with a tape cartridge installed therein.

FIG. 1 depicts a magnetic tape transport 10 employing tape cartridge loading apparatus in accordance with the invention. FIG. 1 shows a magnetic tape cartridge 12 in an installed, operative position within the tape transport 10. The tape transport 10 includes a relatively thin, generally planar deck 14 disposed on top of a relatively thin, generally planar base 16 at one end of the base 16. An enclosure 18 mounted on the base 16 at an end thereof opposite the deck 14 houses electronics and other components for the tape transport 10. A housing 20 extending outwardly from the deck 14 opposite the enclosure 18 has a generally horizontal slot 22 therein for receiving the tape cartridge 12.

The tape cartridge 12 is installed in the tape transport 10 by inserting a forward end 24 of the tape cartridge 12 into the slot 22 at the outside of the housing 20 opposite an inside surface 26 of the housing 20 and thereafter pushing the tape cartridge 12 in a forward direction represented by an arrow 28. As described in detail hereafter, tape cartridge loading apparatus in accordance with the invention engages the tape cartridge 12 after it is partially inserted through the slot 22 and thereafter automatically pushes the tape cartridge 12 into and locks the tape cartridge 12 within the operative position in which it is shown in FIG. 1. When it is desired to move the tape cartridge 12 from the tape transport 10, the tape cartridge loading apparatus acts to unlock and partly eject the tape cartridge 12 back through the slot 22, following which the tape cartridge 12 can be manually grasped and pulled for complete removal thereof from the tape transport 10. The slot 22 in the housing 20 can be provided with a hinging door (not shown) in the manner described in the previously referred to Avra et al patent.

The tape cartridge 12 is provided with a front door 30 which is raised into the position shown in FIG. 1 following insertion of the tape cartridge 12 through the slot 22 and upon movement of the tape cartridge 12 into the operative position shown. The raising of the front door 30 which is hinged at the opposite sides thereof is provided by engagement of camming levers 32 and 34 formed at the opposite sides of the front door 30 with camming brackets 36 and 38 disposed at the opposite sides of the tape cartridge 12. The camming levers 32 and 34 have camming surfaces such as the surface 40 in the case of the camming lever 32 which normally reside in a position inclined relative to the horizontal when the tape cartridge 12 is removed from the tape transport 10. Upon insertion of the tape cartridge 12 into the tape transport 10, the continued movement of the tape cartridge 10 in the forward direction 28 eventually results in the camming brackets 36 and 38 engaging the opposite camming levers 32 and 34 respectively so as to pivot the front door 30 into the upward, open position with continued forward motion of the tape cartridge 12 as the camming surfaces such as the surface 40 are forced to assume a horizontal position as they slide beneath the camming brackets 36 and 38. This action is shown and described in detail in the Avra et al patent. However, the cartridge door arrangement shown in FIG. 1 differs from that shown in the Avra et al patent in that the opposite bosses with rollers used to receive and guide the opposite side edges of and to open the front door of the tape cartridge in Avra et al are not used in the present instance. Instead, and as described hereafter, the tape cartridge 12 is provided with an elongated U-shaped ridge or protrusion at the bottom thereof which is received in and slides along an elongated slot in the deck 14 so as to guide and eventually position the tape cartridge 12 in the desired operative position. The U-shaped ridge or protrusion at the bottom of tape cartridge 12 guides the cartridge 12 within the elongated slot and prevents the cartridge from rocking.

Figure 2:
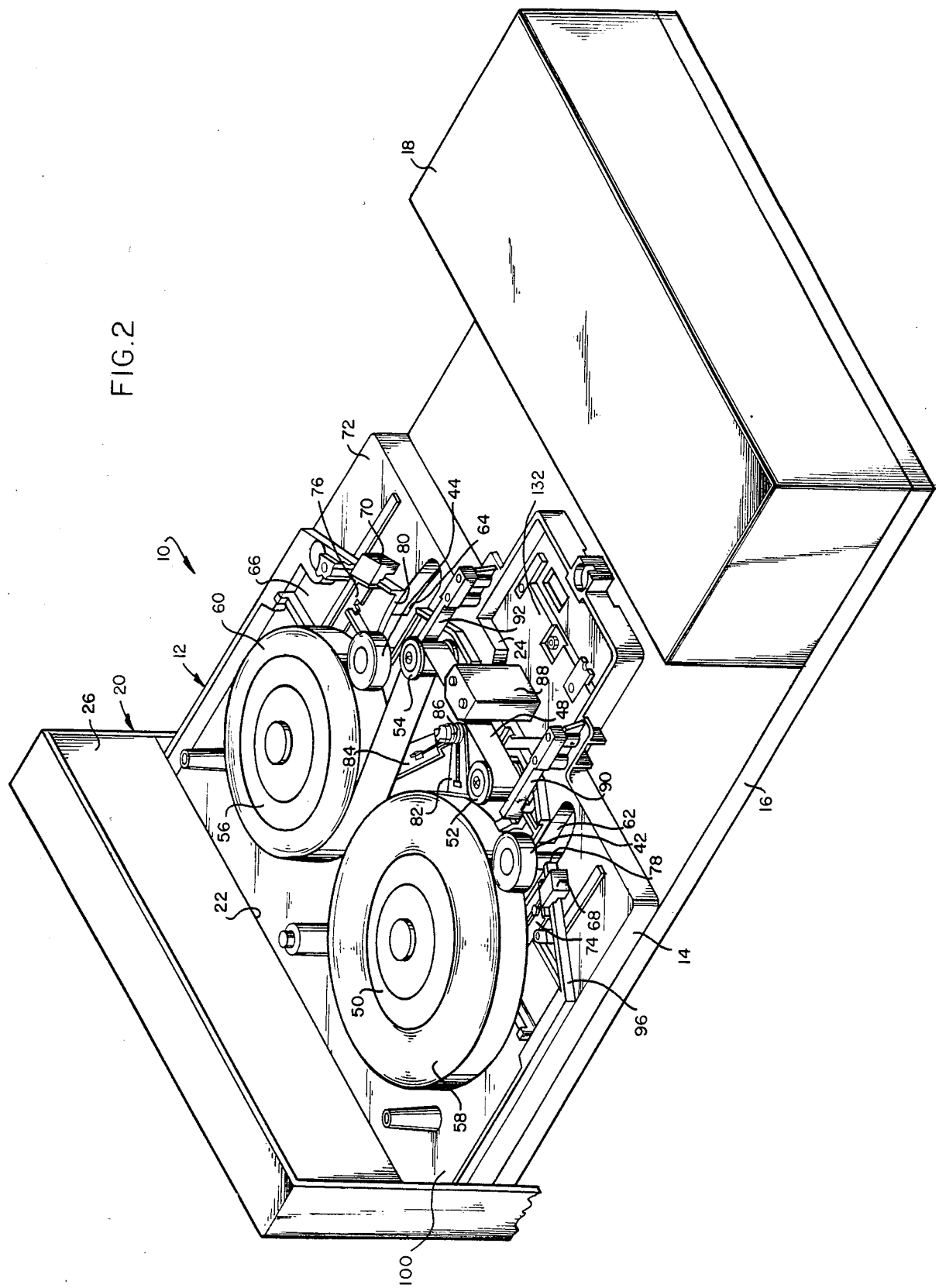
FIG. 2 is a view similar to FIG. 1 but with the tape cartridge housing removed to illustrate the internal parts of the tape cartridge.

The raising of the front door 30 of the tape cartridge 12 with forward movement of the tape cartridge 12 into the operative position shown in FIG. 1 provides for engagement of opposite capstans 42 and 44 with the tape packs on an opposite pair of reels rotatably mounted within the tape cartridge 12. This is best shown in FIG. 2 which is similar to FIG. 1 except that the front door 30 and a housing 46 for the tape cartridge 12 are omitted for clarity of illustration. As shown in FIG. 2 a length of magnetic tape 48 extends from a first reel 50 to the forward end 24 of the tape cartridge 12 where the tape 48 is wrapped around and extends between an opposite pair of idler rollers 52 and 54. From the idler roller 54 the tape extends to a second reel 56. The capstan 42 engages a tape pack 58 on the first reel 50 so as to drive the first reel 50. The capstan 44 engages a tape pack 60 on the second reel 56 so as to drive the second reel 56. The capstans 42 and 44 are mounted for lateral movement within slots 62 and 64 respectively in the deck 14 to accommodate the varying sizes of the tape pack 58 and 60 as the tape 48 is advanced first in one direction and then in the other between the reels 50 and 56. The manner of mounting the capstans 42 and 44 and of bidirectionally driving the tape 48 in this fashion are described in detail in the Avra et al patent.

Figure 6:
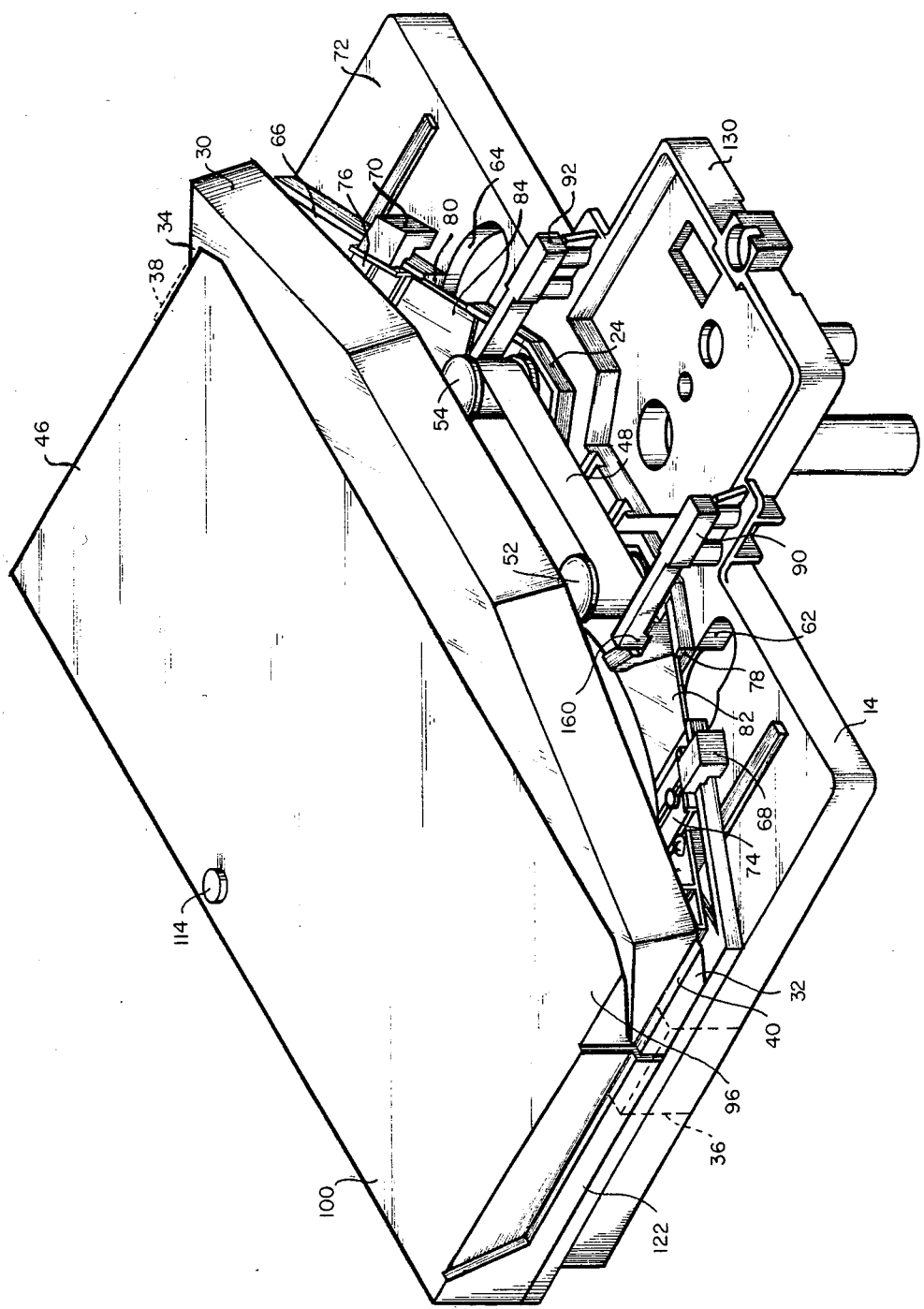
FIG. 6 is a close-up perspective view of the tape cartridge installed in the deck of the tape transport of FIG. 1.

The Avra et al patent also describes in detail certain additional features which are shown in FIGS. 1, 2 and 6. Such features include arrangements for locking the reels 50 and 56 to prevent rotation thereof except when the tape cartridge 12 is in the operative position shown, and dust covers which cover slots in a base 66 of the tape cartridge 12.

Figure 5:
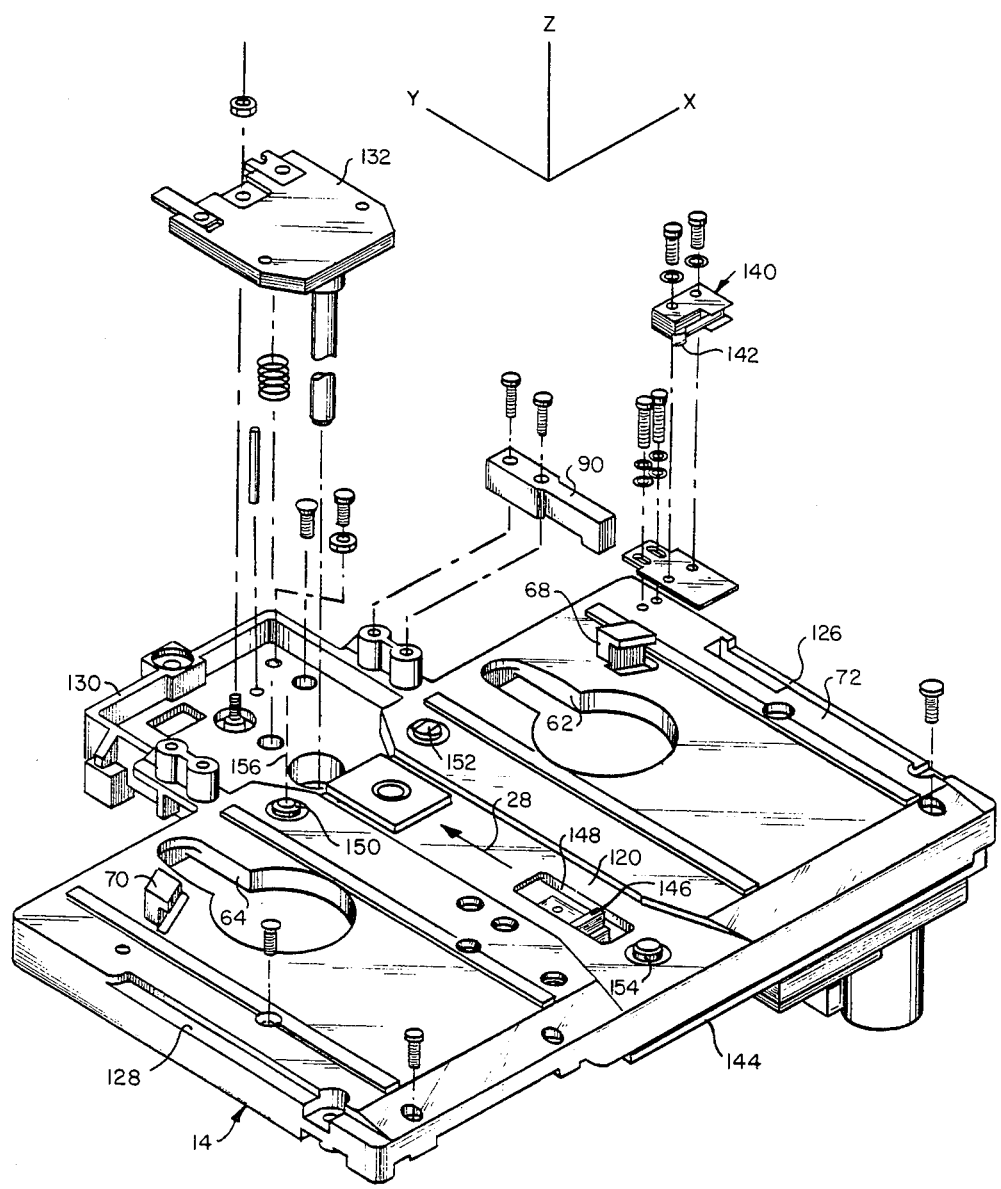
FIG. 5 is a perspective view, partially exploded, of the deck and loader mechanism of the tape transport of FIG. 1.

As seen in FIGS. 1, 2 and 6 as well as in FIG. 5, the deck 14 is provided with an opposite pair of tabs 68 and 70 mounted on an upper surface 72 of the deck 14. As the tape cartridge 12 is moved forward into the operative position shown, the tab 68 engages a reel locking mechanism 72 so as to unlock the mechanism 74 and permit rotation of the reel 50 under the control of the capstan 42. In like fashion the tab 70 engages an opposite reel locking mechanism 76 so as to unlock the reel 56 following engagement of the tape pack 60 thereon by the capstan 44. Upon removal of the tape cartridge 12 from the tape transport 10, the tabs 68 and 70 separate from the reel locking mechanisms 74 and 76, thereby causing the reel locking mechanisms 74 and 76 to lock the reels 50 and 56 against rotation.

The base 66 of the tape cartridge 12 is provided with an opposite pair of slots 78 and 80 therein. The slots 78 and 80 which allow lateral movement of the capstans 42 and 44 toward the reels 50 and 56 in response to the varying tape packs 58 and 60 are normally covered by a pair of dust covers 82 and 84 respectively. The dust covers 82 and 84 which are moved away from the slots 78 and 80 against the resistance of a spring 86 are partially shown in FIGS. 2 and 4.

The tape transport 10 has a magnetic transducer assembly 88 mounted on a forward portion of the deck 14. The magnetic transducer assembly 88 has a plurality of magnetic heads mounted thereon for addressing different tracks disposed across the width of the magnetic tape 48 when the tape cartridge 12 is in the operative position. The magnetic transducer assembly 88 is mounted on an arrangement which steps to different positions along a vertical axis as described in the Avra et al patent so that the magnetic heads within the assembly 88 can address different desired tracks on the magnetic tape 48.

It will be appreciated by those skilled in the art that the tape cartridge 12 must be rather precisely positioned within the tape transport 10 when in the operative position as shown. The magnetic transducer assembly 88 along requires precise positioning of the tape cartridge 12 if the relatively small magnetic heads contained therein are to properly address the various tracks across the width of the magnetic tape 48. The magnetic tape 48 in the present example is one-half inch wide and typically contains 24 tracks spaced-apart across the width thereof. The requirement for a relatively accurate wrap of the magnetic tape 48 around the magnetic transducer assembly 88 between the opposite idler rollers 52 and 54 also requires relatively precise positioning of the tape cartridge 12. The positioning requirements for the tape cartridge 12 are three dimensional in nature. Thus, as shown in FIG. 1 the tape cartridge 12 must be precisely positioned relative to mutually perpendicular X, Y and Z axes. The X and Y axes lie within the generally horizontal plane of the deck 14, while the Z axis extends in a vertical direction. As described hereafter, Z axis positioning of the tape cartridge 12 is accomplished with the help of a pair of horizontal rods 90 and 92 mounted at the forward end of the deck 14 adjacent and on opposite sides of the magnetic transducer assembly 88. Z axis positioning of the tape cartridge 12 is also accomplished using a block 94 mounted on the inside surface 26 of the housing 20 just above the slot 22. The rods 90 and 92 extend generally horizontally above and spaced-apart from the upper surface 72 of the deck 14 and engage the top of the base 66 of the tape cartridge 12 to provide a desired height reference for a forward portion 96 of the tape cartridge 12 adjacent the forward end 24 thereof. The block 94 has a height referencing surface 98 at the underside thereof adapted to be engaged by the top of the housing 46 of the tape cartridge 12 at a rear portion 100 of the tape cartridge 12.

Figure 3:
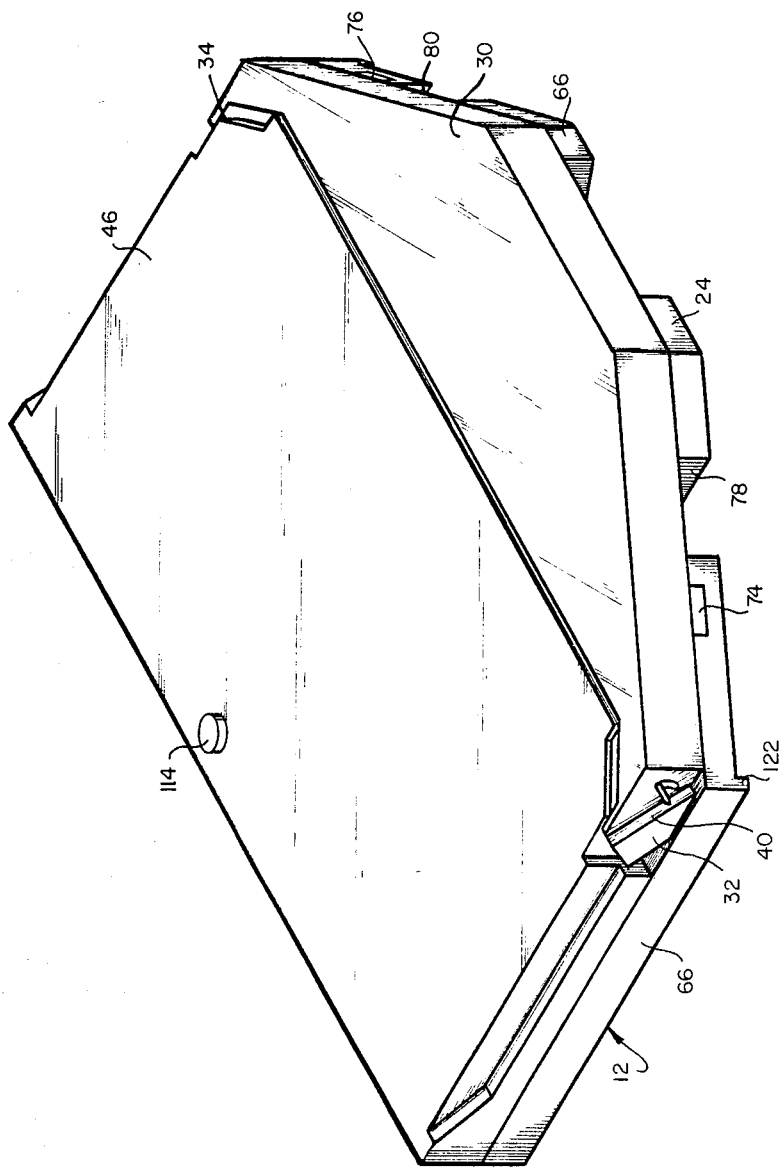
FIG. 3 is a perspective view of the tape cartridge of FIG. 1.
Figure 4:
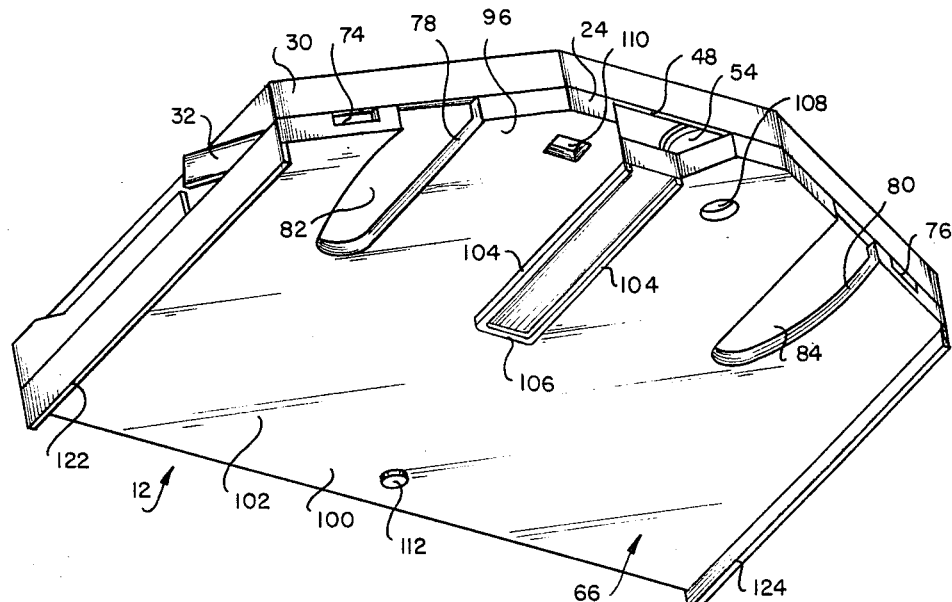
FIG. 4 is a perspective view of the tape cartridge of FIG. 1 different from the view of FIG. 3 and illustrating the underside thereof.

The tape cartridge 12 is further shown in FIGS. 3 and 4. In both of those Figs., the tape cartridge 12 is removed from the tape transport 10 so that the front door 30 thereof is in the closed position in which it is disposed on the base 66 at the front portion 96 of the cartridge 12 to cover and protect the idler rollers 52 and 54 and the length of the magnetic tape 48 extending therebetween. The closed front door 30 further acts to seal the inside of the cartridge 12 from dirt and other foreign particles and objects during storage and handling of the tape cartridge 12.

FIG. 3 shows the orientation of the camming levers 32 and 34 at the opposite ends of the front door 30 when the front door 30 is in the closed position. As seen in FIG. 3 the camming surface 40 of the camming lever 32 is inclined at an angle relative to the horizontal. Upon insertion of the tape cartridge 12 into the tape transport 10 the camming brackets 36 and 38 engage the camming surfaces of the camming levers 32 and 34 causing the front door 30 to pivot into the open position shown in FIG. 1 where the camming surfaces such as the surface 40 assume a relatively horizontal position as previously described.

FIG. 4 depicts the underside of the tape cartridge 102 which is formed by a lower surface 102 of the base 66. As shown in FIG. 4 the lower surface 102 has a generally U-shaped ridge 104 which extends downwardly from the lower surface 102 in a central location at the forward portion 96 of the tape cartridge 12. The U- shaped ridge 104 is elongated in the direction of the arrow 28 shown in FIG. 1 and as described hereafter is received within a mating slot in the upper surface 72 of the deck 14 to facilitate loading and unloading of the tape cartridge 12 within the tape transport 10. Also, as described hereafter, the U-shaped ridge 104 has a central portion 106 thereof which is engaged by a moving pawl to automatically push the tape cartridge 12 into the operative position within the tape transport 10.

As shown in FIG. 4 the lower surface 102 of the base 66 of the tape cartridge 12 is also provided with first and second recesses 108 and 110 therein, the recesses 108 and 110 being disposed on opposite sides of the U-shaped ridge 104 within the forward portion 96 of the tape cartridge 12. The first recess 108 is of generally circular, partially conical configuration, while the second recess 110 is of generally rectangular configuration. As described hereafter the recesses 108 and 110 receive pins of similar configuration so as to properly position the tape cartridge 12 relative to the X and Y axes shown in FIG. 1 during loading of the tape cartridge 12 in the tape transport 10. Such loading operation also utilizes a raised button 112 which extends downwardly from the lower surface 102 of the base 66 of the tape cartridge 12 adjacent the rear portion 100 of the tape cartridge 12 and which also receives a pin so as to force the tape cartridge 12 into contact with the height referencing surface 98 of the block 94 mounted on the housing 20. The height referencing surface 98 is engaged by a raised button 114 which extends upwardly from the housing 46 of the tape cartridge 12 at the rear portion 100.

The details of the top of the deck 14 are shown in FIG. 5. As shown therein the deck 14 is provided with an elongated slot 120 extending along the length of the deck at a central portion thereof and configured to receive the U-shaped ridge 104 of the tape cartridge 12. The depth of the slot 120 is slightly less than the distance that the U-shaped ridge 104 extends below the lower surface 102 of the base 66 of the tape cartridge 12. This enables opposite portions of the U-shaped ridge 104 to ride along opposite sides of the bottom of the slot 120 with the lower surface 102 of the base 66 of the tape cartridge 12 disposed just above the top surface 72 of the deck 14. The U-shaped ridge 104 prevents rocking of the tape cartridge 12 during sliding within the slot 120. The slot 120 serves to receive the U-shape ridge 104 and thereafter guide the tape cartridge 12 in the forward direction shown by the arrow 28 in FIG. 1 with little resistance or drag being created by contact of the lower surface 102 of the cartridge base 66 with the top surface 72 of the deck 14. As shown in FIG. 4 the opposite side edges of the cartridge base 66 are provided with elongated ridges 122 and 124 extending downwardly from the lower surface 102 of the cartridge base 66. The ridges 122 and 124 are received within and engage mating slots 126 and 128 at the opposite side edges of the deck 14 to the extent necessary to maintain the tape cartridge 12 in an upright, horizontal position as the U-shaped ridge 104 of the tape cartridge 12 slides back and forth within the slot 120.

As shown in FIG. 5 the deck 14 has a forward portion 130 thereof adapted to receive a platform 112. The platform 132 mounts the magnetic transducer assembly 88 and can be incremented vertically to position the magnetic transducer assembly 88 at different vertical positions relative to the length of magnetic tape 48 extending between the idler rollers 52 and 54 when the tape cartridge 12 is in the operative position. The magnetic transducer assembly 88 is omitted from FIG. 5 for the sake of clarity, but is shown in its mounted position on the platform 132 in FIGS. 1 and 2. The arrangement for stepping the platform 132 and the included magnetic transducer assembly 88 between different vertical positions is described in detail in the Avra et al patent.

A switch assembly 140 is mounted on the surface 72 of the deck 14 adjacent a forward portion of the deck 14 at a side edge of the deck 14. The switch assembly 140 includes a switch contact 142 disposed in the path of the tape cartridge 12.

Initially, the tape cartridge 12 is manually inserted through the slot 22 in the housing 20 and is pushed forward in the direction shown by the arrow 28 in FIG. 1. As the tape cartridge 12 moves forward in this fashion, it eventually contacts the switch contact 142 so as to close a circuit within the switch assembly 140 and begin driving a loader mechanism 144 mounted on the underside of the deck 14 and shown in detail in FIGS. 13–15.

The loader mechanism 144 operates a pawl 146 disposed within an elongated aperture 148 in the bottom of the slot 120 in the deck 14. The loader mechanism 144 also operates a first pin 150 of generally circular, partly conical shape slideably disposed within the deck 14, a second pin 152 of generally rectangular cross-sectional shape slideably disposed within the deck 14 and a third pin 154 slideably disposed within the deck 14. The first pin 150 is adapted to engage the first recess 108 of circular, partly conical configuration within the base 66 of the tape cartridge 12. The second pin 152 of generally rectangular configuration is adapted to engage the second recess 110 of generally rectangular configuration within the base 66 of the tape cartridge 12. The third pin 154 is adapted to engage the raised button 112 on the base 66 of the tape cartridge 12.

When the tape cartridge 12 is inserted in the tape transport 10 far enough to engage the switch contact 142 and close the circuit within the switch assembly 140, the loader mechanism 144 responds by moving the pawl 146 along the aperture 148 in the forward direction represented by the arrow 28 which is shown in FIG. 1 and which is reproduced in FIG. 5. During the first portion of travel of the pawl 146 along the aperture 148, the pawl 146 rises within the aperture 148 so that it protrudes well above the bottom surface of the slot 120 in the deck 14. Thereafter, the pawl 146 remains at such height as it continues its movement in the forward direction represented by the arrow 28 along the aperture 148. This action causes the pawl 146 which is normally recessed within the aperture 148 out of the way of the U-shaped ridge 104 on the base 66 of the tape cartridge 12 to rise up and engage the central portion 106 of the U-shaped ridge 104 and thereafter push the tape cartridge 12 in the forward direction as the pawl 146 moves along the aperture 148. Eventually the tape cartridge 12 arrives at the region of the operative position adjacent the magnetic transducer assembly 88. When this occurs the loader mechanism 144 causes the first, second and third pins 150, 152 and 154 to rise in sequence such that they eventually extend outwardly from the top surface 72 of the deck 14. As this occurs, the first pin 150 which is the first of the three pins 150, 152 and 154 to rise enters the first recess 108 in the base 66 of the tape cartridge 12. The first pin 150 continues to rise and extend into the first recess 108 until the upper surface of the base 66 of the tape cartridge 12 engages the height referencing rods 90 and 92 which are mounted on the deck 14.

The first pin 150 defines a pivot axis 156 shown in FIG. 5 about which the tape cartridge 12 is potentially rotatable. However, the second pin 152 begins to rise soon after the first pin 150 begins to rise and engages the second recess 110 within the base 66 of the tape cartridge 12. Accordingly, the second pin 152 and the second recess 110 quickly establish a predetermined rotational position of the tape cartridge 12 relative to the pivot axis 156. It is in this manner that the pins 150 and 152 and the mating recesses 108 and 110 establish precise locating of the tape cartridge 12 relative to the X and Y axes which are shown in FIG. 1 and which are reproduced in FIG. 5.

The rising pins 150 and 152 not only accomplish precise X and Y axis positioning of the tape cartridge 12, but they also accomplish precise Z axis positioning in conjunction with the third pin 154. As the first and second pins 150 and 152 rise so as to accomplish X and Y axis positioning through engagement with the first and second recesses 108 and 110, they eventually push the upper surface of the base 66 of the tape cartridge 12 into contact with the rods 90 and 92. This achieves the desired Z axis positioning of the forward portion 96 of the tape cartridge 12 and is shown in detail in FIG. 6 as well as in FIGS. 1 and 2. As shown in FIG. 6 the rod 90 has a downwardly extending portion 160 at an outer end thereof which engages the top surface of the cartridge base 66. The rod 92 which is partly hidden by the idler roller 54 in FIG. 6 is similarly configured. The pins 150 and 152 are positioned directly beneath the outer ends of the rods 92 and 90 respectively so as to greatly minimize any tendency for the tape cartridge 12 to bend in response to the upward forces exerted thereon.

In conjunction with the desired Z axis positioning of the forward portion 96 of the tape cartridge 12, the rear portion 100 of the tape cartridge 12 is positioned in a desired location relative to the Z axis by action of the third pin 154. The third pin 154 which begins to rise soon after the second pin 152 begins rising eventually engages the raised button 112 on the lower surface 102 of the cartridge base 66 and thereafter pushes the rear portion 100 of the tape cartridge 12 upwardly until the raised button 114 on the housing 46 engages the height referencing surface 98 at the underside of the block 94. The third pin 154 is located directly below the height referencing surface 98 in order to minimize any tendency for the tape cartridge 12 to bend.

During the latter portion of the upward travel of the third pin 154, the loader mechanism 144 acts to move the pawl 146 rearwardly in a direction opposite the forward direction of the arrow 28 along the aperture 148. This pulls the pawl 146 out of contact with the central portion 106 of the U-shaped ridge 104 of the tape cartridge 12 and moves the pawl 146 away from the central portion 106 of the U-shaped ridge 104 in preparation for eventual ejection of the tape cartridge 12 from the tape transport 10. Ejection of the tape cartridge 12 is accomplished electronically through manual actuation of a switch or other action which again drives the loader mechanism 144. The loader mechanism 144 responds by lowering the third, second and first pins 154, 152 and 150 back into the deck 14 while at the same time moving the pawl 146 to a rearmost position within the elongated aperture 148 in which the pawl 146 is moved downwardly and out of the way of the central portion 106 of the U-shaped ridge 104 of the tape cartridge 12.

Figure 7:
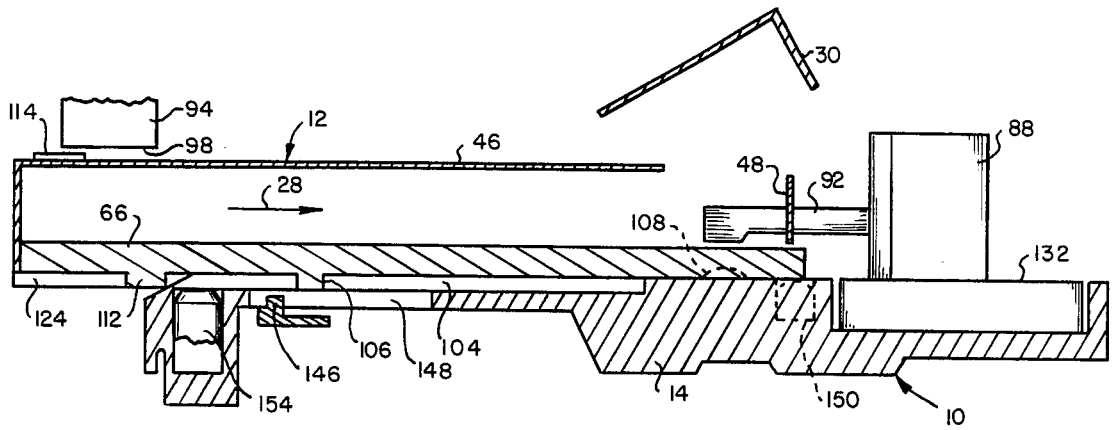
FIG. 7 is a sectional view of the deck of the tape transport and the tape cartridge of FIG. 1 as the tape cartridge is inserted in the deck far enough for the pawl of the loader mechanism to begin moving toward engagement with the tape cartridge.
Figure 8:
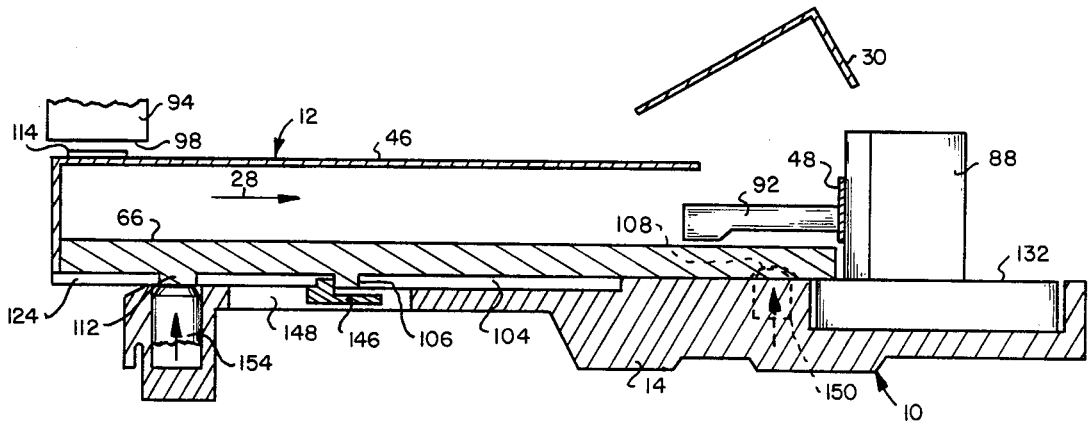
FIG. 8 is a sectional view similar to FIG. 7 but with the tape cartridge having been moved into the region of the operative position by the pawl.
Figure 9:
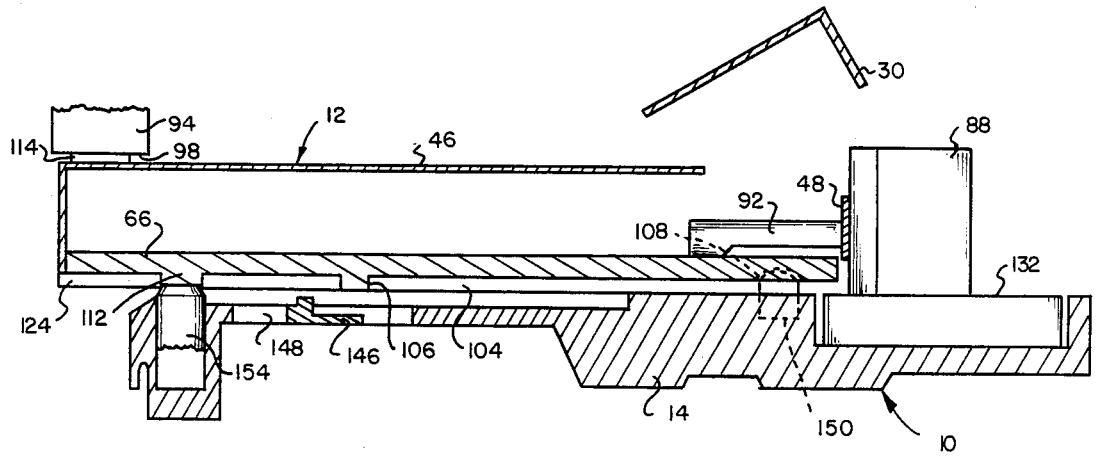
FIG. 9 is a sectional view similar to FIG. 8 but with the tape cartridge having been moved into and locked in the operative position by the three pins operated by the loader mechanism.

The cartridge loading operation just described can be better understood with reference to FIGS. 7-9 which comprise sectional views of the tape cartridge 12 and the deck 14 in conjunction with the pawl 146, the first pin 150 and the third pin 154. The second pin 152 which is not shown in FIGS. 7-9 functions essentially in the same manner as the first pin 150. Also, the reel 56 and other internal components within the tape cartridge 12 are omitted for simplicity. However, the length of magnetic tape 48 which extends between the idler rollers 52 and 54 is illustrated in FIGS. 7-9 in order to convey an understanding of the manner in which it approaches and is then positioned against the magnetic transducer assembly 88.

FIG. 7 depicts the condition in which the tape cartridge 12 has been manually inserted through the slot 22 in the housing 20 and has been manually pushed in the forward direction 28 into the vicinity of the switch assembly 140. The front door 30 of the tape cartridge 12 has been cammed into the open position so as to expose the magnetic tape 48 to the magnetic transducer assembly 88. However, the magnetic tape 48 is still well back of the magnetic transducer assembly 88. The U-shaped ridge 104 on the lower surface 102 of the cartridge base 66 rests on the bottom surface of the slot 120 in the deck 14. At the same time the raised button 114 on the cartridge housing 46 is disposed below and spaced-apart from the height referencing surface 98 of the block 94. Likewise, the upper surface of the cartridge base 66 is disposed beneath and spaced apart from the rods 90 and 92 (only the rod 92 is shown in FIGS. 7-9). The pawl 146 is positioned below and behind the central portion 106 of the U-shaped ridge 104. The pins 150 and 154 are in lowered positions within the deck 14.

As noted in connection with FIG. 7 the condition depicted therein assumes that the tape cartridge 12 has been manually inserted to the position shown in which the cartridge 12 is in the vicinity of the switch assembly 140 mounted on the upper surface 72 of the deck 14. When the switch contact 142 is engaged by the tape cartridge 12 to close a circuit within the switch assembly 140, the loader mechanism 144 is activated and automatic cartridge loading commences. The pawl 146 rises upwardly and out of the elongated aperture 148 while simultaneously moving forward along the aperture 148 in the forward direction 28. This causes the pawl 146 to engage the central portion 106 of the U-shaped ridge 104 and push the tape cartridge 12 in the forward direction 28. FIG. 8 shows the condition in which the pawl 146 has pushed the tape cartridge 12 in the forward direction 28 to the region of the operative position. The magnetic tape 48 now contacts the magnetic transducer assembly 88. Also, the raised button 114 while still spaced apart from the height referencing surface 98 is now centrally disposed below the surface 98. The raised button 112 has been positioned directly above the third pin 154. The first recess 108 in the cartridge base 66 is positioned directly above the first pin 150. While the tape cartridge 12 is now located in the region of the operative position, it has not as yet been moved into such operative position because the pins 150, 152 and 154 remain in their lowered positions within the deck 14.

Immediately following movement of the tape cartridge 12 into the region of the operative position by the pawl 146 as shown in FIG. 8, the loader mechanism 144 begins raising the pins 150, 152 and 154. As previously described the first and second pins 150 and 152 seat within the recesses 108 and 110 respectively in the cartridge base 66 so as to precisely position the tape cartridge 12 relative to the X and Y axes. Precise Z axis positioning is accomplished by the continued upward movement of the pins 150, 152 and 154. FIG. 9 depicts the condition in which the tape cartridge 12 has been moved into the desired operative position with precise cartridge positioning relative to the X, Y and Z axes having been accomplished. The first and second pins 150 and 152 have positioned the upper surface of the cartridge base 66 against the rods 90 and 92. The third pin 154 has positioned the rised button 114 in contact with the height referencing surface 98 at the underside of the block 94. It was previously noted that the pawl 146 is moved away from the central portion 106 of the U-shaped ridge 104 concurrent with completion of the upward movement of the pin 154. As seen in FIG. 9 the pawl 146 has been moved in a rearward direction away from the central portion 106 of the U-shaped ridge 104 and back toward the starting position shown in FIG. 7.

The tape cartridge 12 remains in the operative position shown in FIG. 9 until such time as the tape cartridge 12 is to be ejected. Ejection is commenced by again driving the loader mechanism 144 in a manner so as to return the pawl 146 to the starting position shown in FIG. 7 while at the same time lowering the pins 150, 152 and 154 into the lowered positions shown in FIG. 7. With the pins 150 and 152 lowered so as to be removed from the recesses 108 and 110 and with the third pin 154 pulled away from the raised button 112, the tape cartridge 12 is partially ejected by action of the capstans 42 and 44 which resiliently engage the tape packs 58 and 60 within the tape cartridge 12. With the tape cartridge partially ejected, it is a simple matter to manually grasp the rear portion 100 of the tape cartridge 12 and remove it from the slot 22 in the housing 20.

Figure 11:
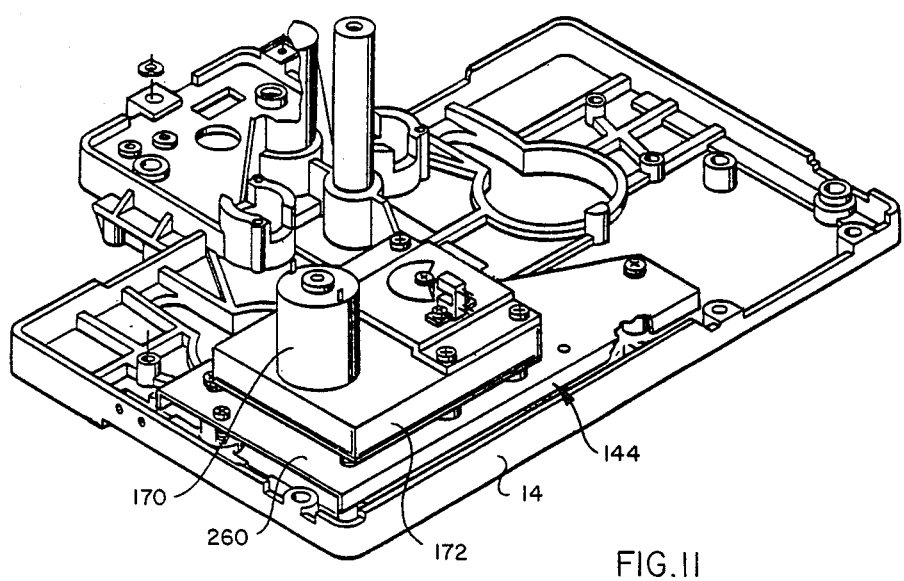
FIG. 11 is a view similar to FIG. 10 but with the various parts of the exploded view of FIG. 10 assembled.
Figure 10:
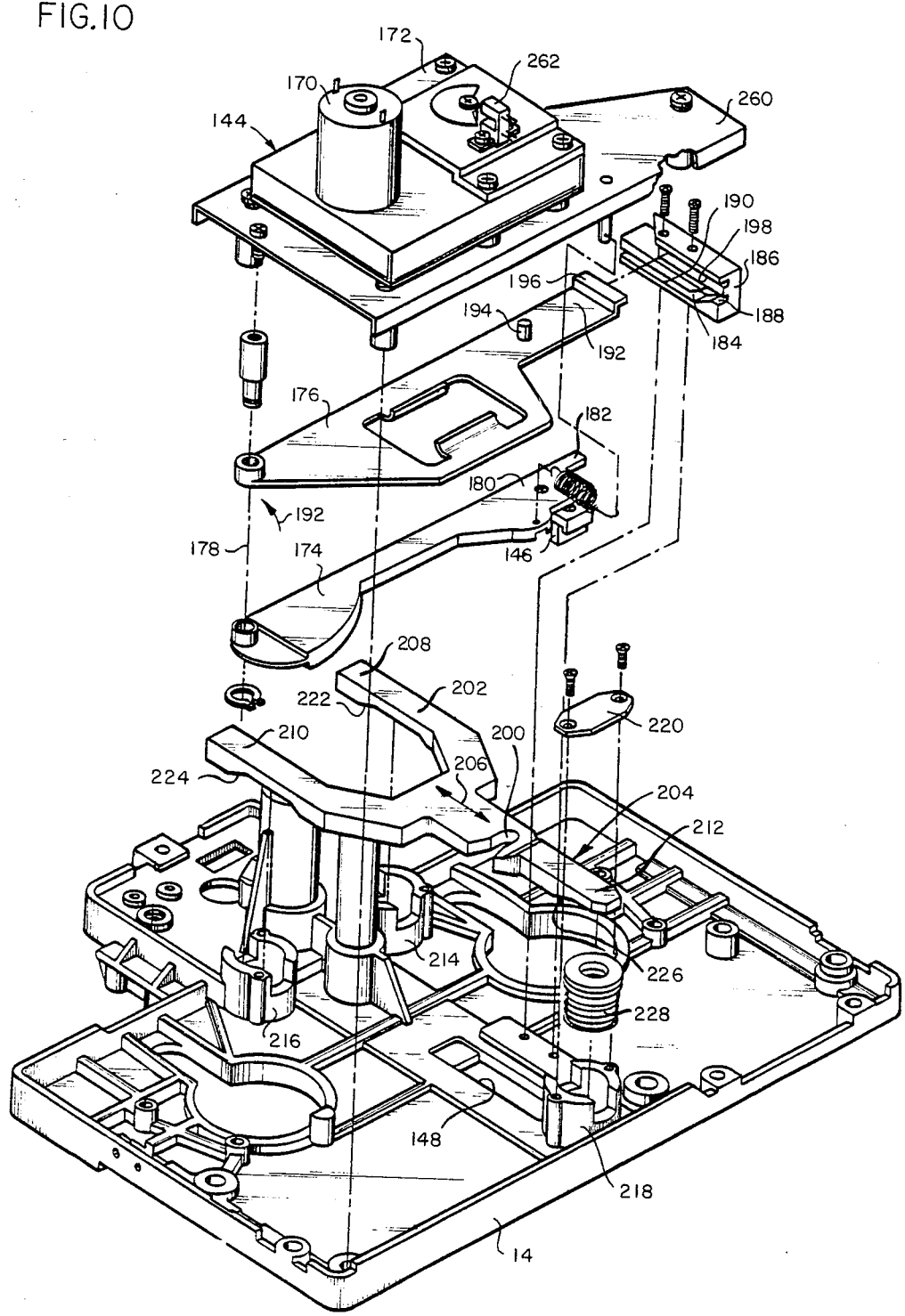
FIG. 10 is a perspective, exploded view of the loader mechanism and the underside of the deck of the tape transport of FIG. 1.

The details of the loader mechanism 144 and the manner in which it moves the pawl 146 and raises and lowers the pins 150, 152 and 154 are shown in FIGS. 10-15. FIGS. 10 and 11 illustrate the loader mechanism 144 and the manner in which it is mounted on the underside of the deck 14, FIG. 10 being an exploded view and FIG. 11 being an assembled view. The loader mechanism 144 includes a motor 170 coupled to a transmission 172 providing a gear reduction for the motor 170. The transmission 172 is coupled to rotatably drive a pair of cams (not shown in FIGS. 10 and 11) which engage different ones of a first elongated arm 174 and a second elongated arm 176. The elongated arms 174 and 176 are mounted for rotation about a common pivot axis 178 at a first end of each of the arms 174 and 176.

The first elongated arm 174 has an outer second end 180 thereof which mounts the pawl 146 thereon and which terminates in an outwardly extending tab 182. The tab 182 resides within a slot 184 in a guide block 186 mounted on the underside of the deck 14. As seen in FIG. 10 the slot 184 extends from a lower height portion 188 thereof to an upper height portion 190 thereof along the length of the guide block 186. Prior to loading of a tape cartridge 12 in the tape transport 10 the outwardly extending tab 182 is positioned within the lower height portion 188 of the slot 184. This holds the outer second end 180 of the first elongated arm 174 in a lowered position relative to the upper surface 72 of the deck 14 so that the pawl 146 is disposed in a lower position within the elongated aperture 148 as seen in FIG. 7.

Upon insertion of a tape cartridge 12 into the tape transport 10, the motor 170 and the transmission 172 begin rotating the elongated arms 174 and 176 in a direction shown by an arrow 192 in FIG. 10 in a manner which is described hereafter. This causes the outwardly extending tab 182 at the outer second end 180 of the first elongated arm 174 to slide along the lower height portion 188 of the slot 184 to the upper height portion 190 in which the outer second end 180 of the first elongated arm 174 is moved into a raised position. This causes the pawl 146 to rise within the elongated aperture 148 and eventually engage the central portion 106 of the U-shaped ridge 104 and push the tape cartridge 12 in the forward direction 28 as illustrated in FIG. 8.

The second elongated arm 176 has an outer second end 192 thereof which mounts a pin 194 thereon. The outer second end 192 of the second elongated arm 176 terminates in an outwardly extending tab 196 which resides within a slot 198 in the guide block 186. Unlike the slot 184 which has the portions 188 and 190 of different height, the slot 198 has a constant height along the length of the guide block 186 so as to maintain the outer second end 192 of the second elongated arm 176 at a constant height as the arm 176 rotates about the common pivot axis 178. The motor 170 and the transmission 172 rotate the second elongated arm 176 about the pivot axis 178 together with the first elongated arm 174. The elongated arms 174 and 176 do not move together but are common in the movements such that each moves first in the direction of the arrow 192 and then in an opposite direction in a manner which is described hereafter. This causes the pin 194 which is received within a slot 200 in a fork 202 of a fork assembly 204 to slide the fork 202 back and forth in opposite directions as represented by an arrow 206.

Sliding movement of the fork 202 provides the raising and lowering of the first, second and third pins 150, 152 and 154 previously described. The fork 202 has opposite legs 208 and 210 at a forward portion thereof and a leg 212 at a rear portion thereof. The legs 208 and 210 are slideably received within a pair of hollow collars 214 and 216 respectively which are formed at the underside of the deck 14. In like fashion the leg 212 is slideably received within a hollow collar 218 formed at the underside of the deck 14. A mounting plate 220 is secured to the end of the hollow collar 218 to hold the leg 212 of the fork 202 in place therein. The legs 208 and 210 of the fork 202 are held within the hollow collars 214 and 216 in similar fashion by mounting plates which are omitted from FIG. 10 for clarity of illustration.

The leg 208 of the fork 202 has a ramp portion 222 at a surface thereof presented within the hollow collar 214. In similar fashion the leg 210 has a ramp portion 224 thereof presented within the hollow collar 216, and the leg 212 has a ramp portion 226 presented within the hollow collar 218. The ramp portion 226 of the leg 212 resides against and actuates a pin assembly 228 which includes the third pin 154 and which is described in detail in connection with FIG. 12. The ramp portion 222 of the leg 208 of the fork 202 engages a pin assembly (not shown in FIG. 10 for reasons of clarity) which contains the first pin 510 and which is identical to the pin assembly 228. The ramp portion 224 of the leg 210 engages a pin assembly (omitted from FIG. 10 for reasons of clarity) which includes the second pin 152 and which is virtually identical in configuration to the pin assembly 228. As will be apparent from the discussion hereafter in connection with FIG. 12, rotation of the second elongated arm 176 in the direction of the arrow 192 by the motor 170 and the transmission 172 slides the fork 202 in a first one of the directions represented by the arrow 202 so as to cause the ramp portions 222, 224 and 226 within the hollow collars 214, 216 and 218 respectively to raise the pins 150, 152 and 154 respectively from the upper surface of the deck 14. Conversely, rotation of the second elongated arm 176 in a second direction opposite the direction of the arrow 192 by the motor 170 and the transmission 172 slides the fork 202 in an opposite second direction, resulting in the ramp portions 222, 224 and 226 lowering the pins 150, 152 and 154 respectively. The ramp portion 222 is located from the first pin 150 by a distance which is less than the distance between the ramp portion 224 and the second pin 152. Similarly, the distance between the ramp portion 224 and the pin 152 is less than the distance between the ramp portion 226 and the third pin 154. Consequently, when the fork 202 is moved in the first direction represented by the arrow 202, the first pin 150 begins to rise before the second pin 152 which in turn begins to rise before the third pin 154. Upon movement of the fork 202 in the opposite direction, the third pin 154 is lowered first, followed by the second pin 152 and then the first pin 150.

Figure 12:
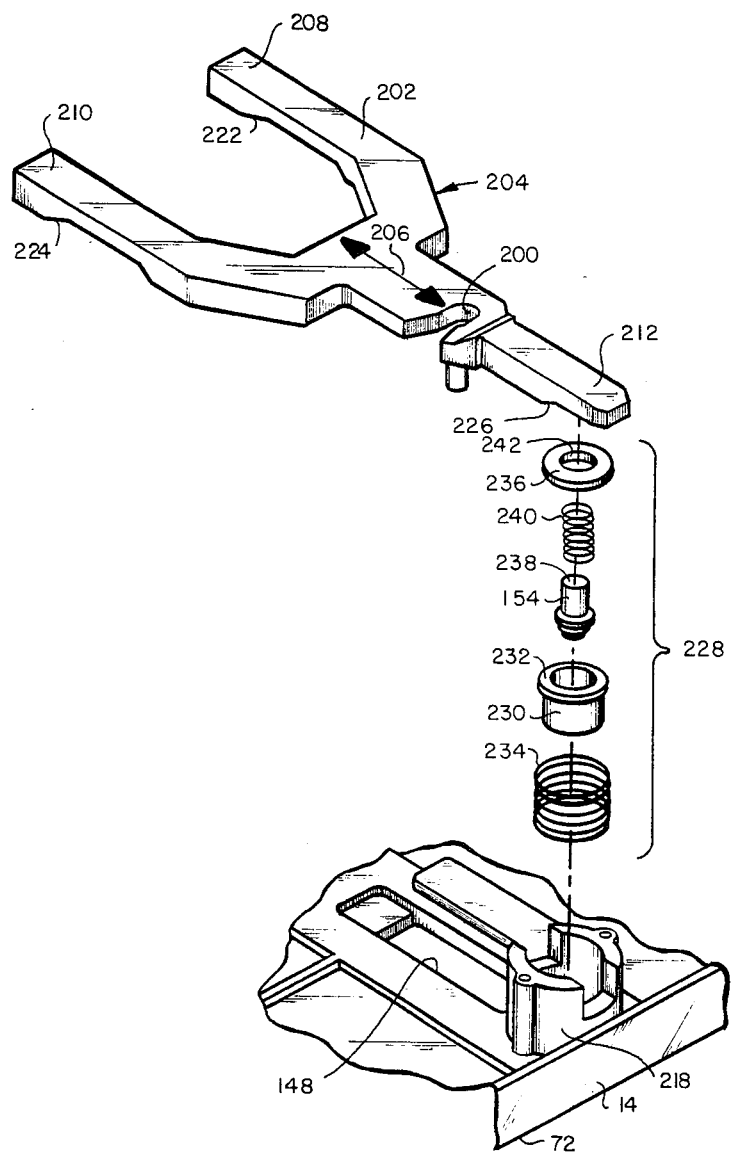
FIG. 12 is a perspective, exploded view of a portion of the assembly shown in FIG. 10 illustrating the manner in which sliding movement of the fork assembly raises and lowers one of the pins within the deck.

The action just described can be better understood with reference to FIG. 12 which depicts the pin assembly 228 in exploded fashion in conjunction with the fork 202 and an associated portion of the deck 14. The third pin 154 seats within a collar 230 having an annular flange 232 extending outwardly at the base of the collar 230 and receiving one end of a coil spring 234. The coil spring 234 which seats within the hollow collar 218 resiliently biases the collar 230 in a direction opposite the upper surface 72 of the deck 14 and toward the leg 212 of the fork 202 so as to force a washer 236 against the leg 212. The third pin 154 has a lower end 238 thereof which extends through a coil spring 240 and through a central aperture 242 in the washer 236 so as to reside against the surface of the leg 212.

The collar 230 and the coil spring 234 act to keep the third pin 154 biased against the surface of the leg 212. At the same time, the third pin 154 responds to a change in the elevation of the surface of the leg 212 so as to move upwardly and downwardly within the collar 230 and relative to the upper surface 72 of the deck 14. The ramp portion 226 of the leg 212 defines a transition between surfaces of two different elevations on the leg 212. When the surface of lower elevation is presented to the lower end 238 of the third pin 154, the third pin 154 assumes a lowered position within the deck 14. However when the fork 202 is caused to slide so as to pass the ramp portion 226 over the lower end 238 of the third pin 154 and thereby present the surface of higher elevation of the leg 212 at the lower end 238 of the third pin 154, the third pin 154 is pushed upwardly so as to cause the upper end thereof to extend above the upper surface 72 of the deck 14 and engage the raised button 112 at the lower surface 102 of the cartridge base 66 in the manner previously described. The first and second pins 150 and 152 respond to the ramp portions 222 and 224 of the legs 208 and 210 so as to rise and drop within the deck 14 in similar fashion.

Figure 13:
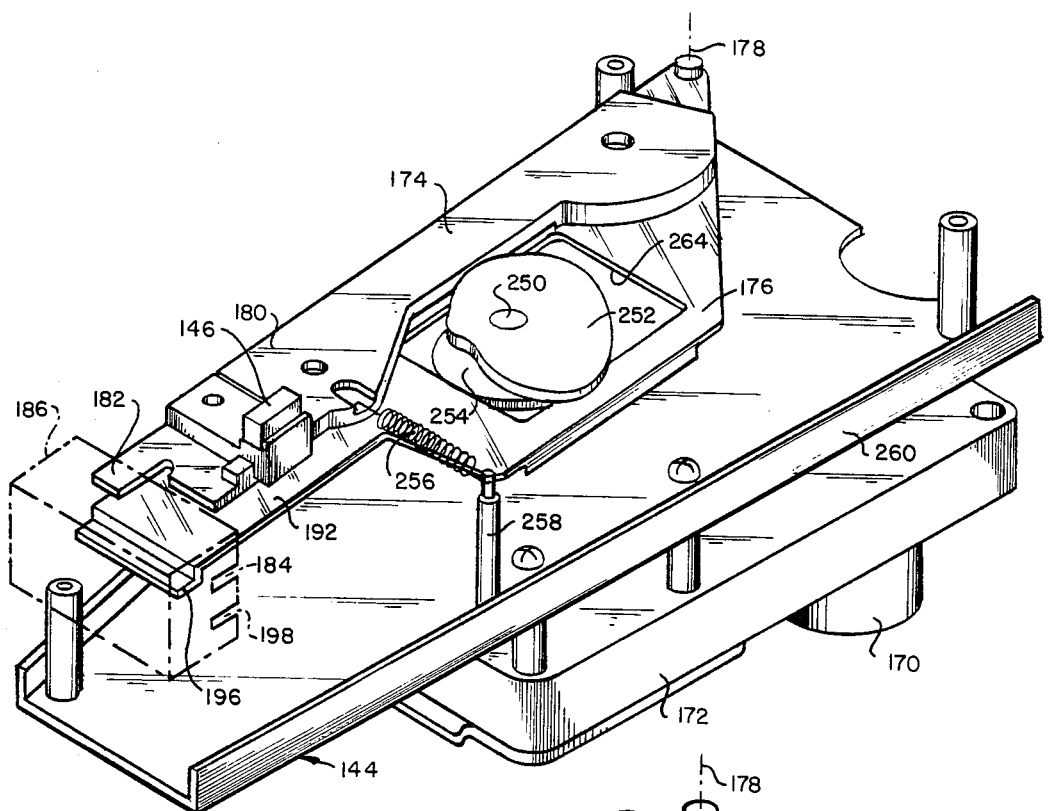
FIG. 13 is a perspective view of the loader mechanism of the tape transport of FIG. 1 illustrating the manner in which a motor and associated transmission rotate a pair of cams so as to rotatably drive a pair of elongated arms.
Figure 14:
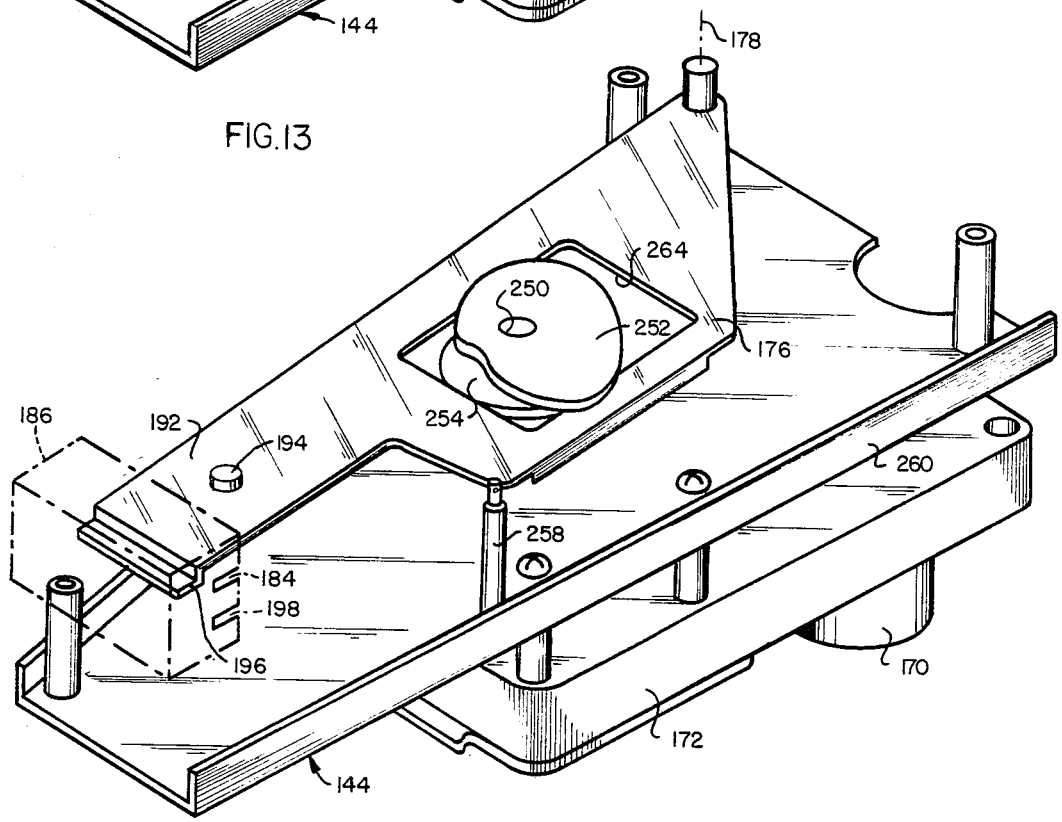
FIG. 14 is a perspective view similar to FIG. 13 but with one of the elongated arms removed for clarity of illustration.

The loader mechanism 144 is shown in greater detail in FIGS. 13-15. The motor 170 drives the gear box 172 which in turn drives a shaft 250 at a considerably slower speed than the nominal rotational speed of the motor 170 due to the gear reduction provided by the transmission 172. Mounted on the shaft 250 are two different cams 252 and 254 which are of non-circular shape designed to achieve certain velocity profiles. The cam 252 is disposed so as to engage an edge of the first elongated arm 174. The cam 254 which is disposed adjacent the cam 252 engages a central portion of the second elongated arm 176. The first elongated arm 174 is held in engagement with the cam 252 by a spring 256 extending between the outer second end 180 of the first elongated arm 174 and a post 258 mounted a frame 260 for the loader mechanism 144. This ensures that the first elongated arm 174 follows the cam 252 as the cam 252 rotates about the shaft 250.

As shown in FIG. 15 a position sensor 262 is coupled to an end of the shaft 250 on the opposite side of the transmission 172 from the cams 252 and 254. This enables the position sensor 262 to determine the precise angular position of the shaft 250 and thereby the positions of the cams 252 and 254. When the tape cartridge 12 is inserted in the tape transport 10 far enough to close the circuit within the switch assembly 140 mounted on the tape deck 14, the motor 170 is energized so as to begin rotating the shaft 250 and the cams 252 and 254 mounted thereon via the transmission 172. Rotation of the cam 252 causes the first elongated arm 174 to begin rotating about the common pivot axis 178 in a first direction represented by the arrow 192 shown in FIG. 10. As the outwardly extending tab 182 at the outer second end 180 of the first elongated arm 174 slides within the slot 184 in the guide block 186, the pawl 146 rises within the elongated aperture 148 and moves in the forward direction 28 so as to engage the central portion 106 of the U-shaped ridge 104 of the tape cartridge 12 and push the tape cartridge 12 into the region of the operative position. At the same time the cam 254 which resides within and engages the opposite sides of an aperture 264 within a central portion of the second elongated arm 176 rotates so as to eventually rotate the second elongated arm 176 in the same direction as the first elongated arm 174. This causes sliding movement of the fork 202 so as to eventually raise the pins 150, 152 and 154 and lock the tape cartridge 12 in the operative position as previously described.

The position sensor 262 determines when the shaft 250 and thus the cam 254 mounted thereon have rotated far enough to have raised the pins 150, 152 and 154 to their maximum upward positions to thereby lock the tape cartridge 12 in the operative position. At that point, the position sensor 262 terminates driving of the motor 170 so as to maintain the tape cartridge 12 locked in the operative position.

The cams 252 and 254 are configured so as to provide the desired sequence of movement of the pawl 146 and the pins 150, 152 and 154 in response to insertion of the tape cartridge 12 and relative to each other. Thus, during the first rotation of the shaft 250 which is eventually terminated by the position sensor 262, the pawl 146 is moved upwardly and then along the aperture 148 in the forward direction 28 and then part way back along the aperture 148 as the position sensor 262 terminates rotation of the shaft 250. In the meantime the cam 254 provides rotation of the second elongated arm 176 so as to cause the pins 150, 152 and 154 to rise from the deck 14 after the pawl 146 has moved the tape cartridge 12 into the region of the operative position and thereafter engage and lock the cartridge 12 in such operative position as the position sensor 262 stops the motor 170 and thereby the shaft 250.

When ejection of the tape cartridge 12 from the tape transport 10 is commanded such as by manual closure of a switch on a control panel for the tape transport 10 or by external electrical signal, the motor 170 is again energized so as to continue rotation of the shaft 250 and of the cams 252 and 254 mounted thereon in the same direction as before. This causes the first elongated arm 174 which had previously been rotated in a first direction as represented by the arrow 192 in FIG. 10 and then partly back in an opposite second direction to complete its rotation in the second direction so as to return the pawl 146 to the lowered position at the front of the elongated aperture 148 in preparation for the next loading of a tape cartridge 12. Simultaneously with this action, the cam 254 rotates the second elongated arm 176 in the second direction so as to slide the fork 202 in a direction which lowers the pins 150, 152 and 154 within the deck 14 to permit release of the tape cartridge 12. When the shaft 250 has returned to the starting position as sensed by the position sensor 262, driving of the motor 170 is terminated. In the meantime the tape cartridge 12 has been partially ejected by the resilient mounts of the capstans 42 and 44, and the pawl 46 and the first, second and third pins 150, 152 and 154 are returned to the initial position in preparation for the next loading of the tape cartridge 12.

While the invention has been particularly shown and described with reference to a preferred embodiment thereof, it will be understood by those skilled in the art that various changes in form and details may be made therein without departing from the spirit and scope of the invention.

I claim:

1. An arrangement for loading a tape cartridge in a deck comprising the combination of:
   a deck;
   a magnetic transducer assembly mounted on the deck; and
   a tape cartridge loading assembly mounted on the deck and including as pawl adapted to engage a tape cartridge, means for moving the pawl toward the magnetic transducer assembly to enable the pawl to engage a tape cartridge and move the cartridge into an operative position adjacent the magnetic transducer assembly and means for moving the pawl away from the magnetic transducer assembly to permit removal of a tape cartridge from an operative position adjacent the magnetic transducer assembly, the pawl being disposed adjacent a surface of the deck, the means for moving the pawl toward the magnetic transducer assembly being operative to move the pawl outwardly from the surface of the deck in conjunction with moving the pawl toward the magnetic transducer assembly so as to bring the pawl into contact with a base of a tape cartridge and the means for moving the pawl away from the magnetic transducer assembly being operative to move the pawl toward the surface of the deck in conjunction with moving the pawl away from the magnetic transducer assembly to remove the pawl from contact with a base of a tape cartridge.

2. An arrangement for loading a tape cartridge in a deck comprising the combination of:
   a deck;
   a magnetic transducer assembly mounted on the deck; and
   a tape cartridge loading assembly mounted on the deck and including a pawl adapted to engage a tape cartridge, means for moving the pawl toward the magnetic transducer assembly to enable the pawl to engage a tape cartridge and move the cartridge into an operative position adjacent the magnetic transducer assembly, means for moving the pawl away from the magnetic transducer assembly to permit removal of a tape cartridge from an operative position adjacent the magnetic transducer assembly and means for releasably locking a tape cartridge in an operative position adjacent the magnetic transducer assembly when the means for moving the pawl has enabled the pawl to engage a tape cartridge and move the cartridge into the operative position adjacent the magnetic transducer assembly, the means for releasably locking a tape cartridge in an operative position including a plurality of pins mounted on the deck and capable of being selectively moved outwardly from the surface of the deck to engage a base of a tape cartridge.

3. The invention set forth in claim 2, further including means for providing outward limits of movement of a tape cartridge at forward and rear portions of the tape cartridge in response to outward movement of the plurality of pins to engage the base of the tape cartridge.

4. The invention as set forth in claim 2, wherein the plurality of pins includes first and second pins mounted in the deck adjacent the magnetic transducer assembly and adapted to engage a base of a tape cartridge at a forward portion of the tape cartridge and a third pin mounted in the deck on the opposite side of the first and second pins from the magnetic transducer assembly and adapted to engage a base of a tape cartridge at a rear portion of the tape cartridge, the first pin having a generally circular partially conical shape and the second pin having a generally rectangular cross-sectional shape.

5. An arrangement for loading a tape cartridge in a deck comprising the combination of:
   a deck;
   a magnetic transducer assembly mounted on the deck;
   first means mounted on the deck and operative to engage and position a tape cartridge in a desired position relative to the magnetic transducer assembly along first and second mutually perpendicular axes; and
   second means mounted on the deck and operative to engage and position a tape cartridge in a desire position relative to the magnetic transducer along a third axis perpendicular to both the first and second axes, the first and second means together including first and second pins mounted in the deck adjacent the magnetic transducer assembly, a third pin mounted in the deck on the opposite side of the first and second pins from the magnetic transducer assembly, the first, second and third pins being selectively moveable between a first position in which the first, second and third pins engage a tape cartridge and hold the tape cartridge in the desired position and an opposite second position in which the first, second and third pins are disengaged from a tape cartridge.

6. The invention set forth in claim 5, wherein the first pin is operative to position a tape cartridge for possible rotation about a pivot axis parallel to the third axis when engaging a tape cartridge and the second pin is operative to position the tape cartridge at a desired rotational position relative to the pivot axis when engaging the tape cartridge.

7. The invention set forth in claim 5, wherein the second means further includes first limit means mounted on the deck adjacent the first and second pins and second limit means mounted adjacent the third pin, the first and second limit means being operative to establish desired positions of a forward portion and a rear portion respectively of a tape cartridge relative to the third axis.

8. An arrangement for loading a tape cartridge in a deck comprising the combination of:
a deck having a surface;
means defining an axis of a tape cartridge movement along the surface of the deck whereby a tape cartridge is moved in a first direction along the axis during loading of the tape cartridge in the deck and in an opposite second direction along the axis during unloading of the tape cartridge from the deck;
an elongated arm pivotally mounted at a first end thereof within the deck;
a pawl mounted on a second end of the elongated arm opposite the first end of the elongated arm, the pawl extending outwardly from the surface of the deck and being movable generally along the axis in response to rotation of the elongated arm about the first end thereof; and
means for rotating the elongated arm bidirectionally through a limited range of rotational movement about the first end of the elongated arm.

9. The invention set forth in claim 8, wherein the means for rotating includes a cam of non-circular shape engaging the elongated arm and means for rotatably driving the cam.

10. The invention set forth in claim 8, further including a guide mounted within the deck and having a slot therein receiving the second end of the elongated arm, the slot being configured to move the pawl outwardly and inwardly relative to the surface of the deck as the pawl is moved generally along the axis in opposite directions.

11. The invention set forth in claim 8, further including a tape cartridge having a ridge protruding from a base thereof, the ridge being engageable by the pawl.

12. The invention set forth in claim 11, wherein the ridge is part of a protrusion of elongated configuration extending outwardly from a base of the tape cartridge, the deck has a slot therein extending along the axis and adapted to receive the protrusion of the tape cartridge, the deck has an aperture therein extending along a portion of the slot and the pawl extends upwardly within the aperture.

13. An arrangement for loading a tape cartridge in a deck comprising the combination of:
a deck having a surface;
a plurality of pins mounted within the deck at the surface of the deck;
at least one fixed reference surface disposed outwardly from the surface of the deck to define a desired position for a tape cartridge; and
means for moving the plurality of pins outwardly from the surface of the deck to engage a tape cartridge.

14. The invention set forth in claim 13, further including a fork assembly slideably mounted within the deck and coupled to the plurality of pins, the fork assembly being slideable between a first position in which the plurality of pins are disposed generally within the deck and a second position in which the plurality of pins are moved outwardly from the surface of the deck to engage a tape cartridge, an elongated arm pivotally mounted at a first end thereof within the deck and having an opposite second end coupled to the fork assembly, and means for rotating the elongated arm bidirectionally through a limited range of rotational movement about the first end of the elongated arm.

15. The invention set forth in claim 14, wherein the means for rotating includes a cam of non-circular shape engaging the elongated arm and means for rotatably driving the cam.

16. The invention set forth in claim 14, wherein the fork assembly has a plurality of different ramp portions thereof, each of which is disposed a different distance from a different one of the plurality of pins.

17. The invention set forth in claim 13, wherein the plurality of pins includes a first pin of partially conical shape disposed adjacent the at least one fixed reference surface, a second pin of generally rectangular shape disposed adjacent the at least one fixed reference surface and a third pin spaced apart from the first and second pins, and further including a second fixed reference disposed outwardly from the surface of the deck adjacent the third pin.

18. The invention set forth in claim 17, wherein the at least one fixed reference surface is provided by a pair of elongated, spaced-apart elements disposed a fixed distance from and generally parallel to the surface of the deck, and the second fixed reference surface is provided by a portion of a housing extending from the deck and having a tape cartridge loading slot therein.

19. The invention set forth in claim 17, further including a tape cartridge having a partially conical recess in a base thereof for receiving the first pin, a generally rectangular recess in the base thereof for receiving the second pin, and a portion of the base thereof adapted to be engaged by the third pin.

20. An arrangement for loading a tape cartridge in a deck comprising the combination of:
a deck;
a pawl disposed adjacent the deck and adapted to engage and push a tape cartridge into a loaded position when moved in a forward direction;
means for providing at least one reference surface at a selectd position relative to the deck;
a plurality of pins slideably mounted within the deck and adapted to engage and position a tape cartridge against the at least one reference surface when slideably moved into an outward position; and
means coupled to the pawl and to the plurality of pins for moving the pawl in the forward direction and moving the plurality of pins into the outward position in conjunction therewith to push a tape cartridge into a loaded position and position the tape cartridge against the at least one reference surface.

21. The invention set forth in claim 20, wherein the means coupled to the pawl and to the plurality of pins for moving comprises a first elongated arm rotatably mounted about a pivot axis at a first end thereof and having an opposite second end mounting the pawl thereon, a second elongated arm rotatably mounted about the pivot axis at a first end thereof and having an opposite second end, a fork assembly slideably mounted within the deck and coupled to the plurality of pins and to the second end of the second elongated arm, a pair of commonly mounted cams, each engaging a different one of the first and second elongated arms and means for rotatably driving the pair of cams.

22. The invention set forth in claim 21, wherein the pair of cams are shaped so as to rotate the first and second elongated arms in a manner which moves the pawl in the forward direction with the pins being moved into the outward position at the end of movement of the pawl in the forward direction.

* * * * *

UNITED STATES PATENT AND TRADEMARK OFFICE
CERTIFICATE OF CORRECTION

PATENT NO. : 4,561,610

DATED : December 31, 1985

INVENTOR(S) : Ko Ko Gyi

It is certified that error appears in the above-identified patent and that said Letters Patent are hereby corrected as shown below:

Column 3, line 49, "thereafter" should be --therefor--.
Column 8, line 63, "cartridge 102" should be --cartridge 12--.
Column 9, line 62, "platform 112" should be --platform 132--.

Signed and Sealed this

Twenty-ninth Day of April 1986

[SEAL]

Attest:

DONALD J. QUIGG

Attesting Officer

Commissioner of Patents and Trademarks